May 7, 1963 G. E. DIEDRICH 3,088,279
RADIAL FLOW GAS TURBINE POWER PLANT
Filed Aug. 26, 1960 2 Sheets-Sheet 1
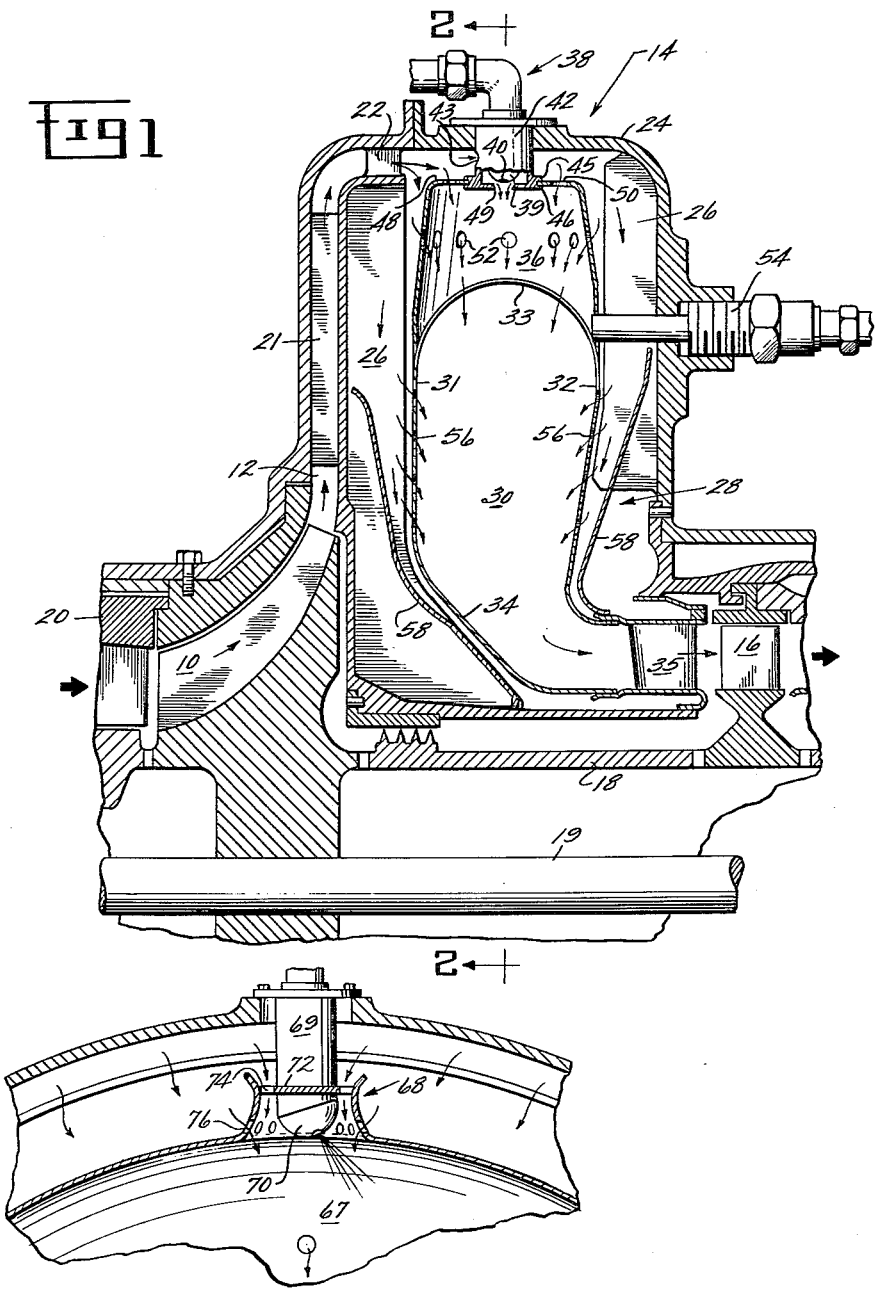
INVENTOR.
GUNTHER E. DIEDRICH
BY
Harry C. Burgess
ATTORNEY

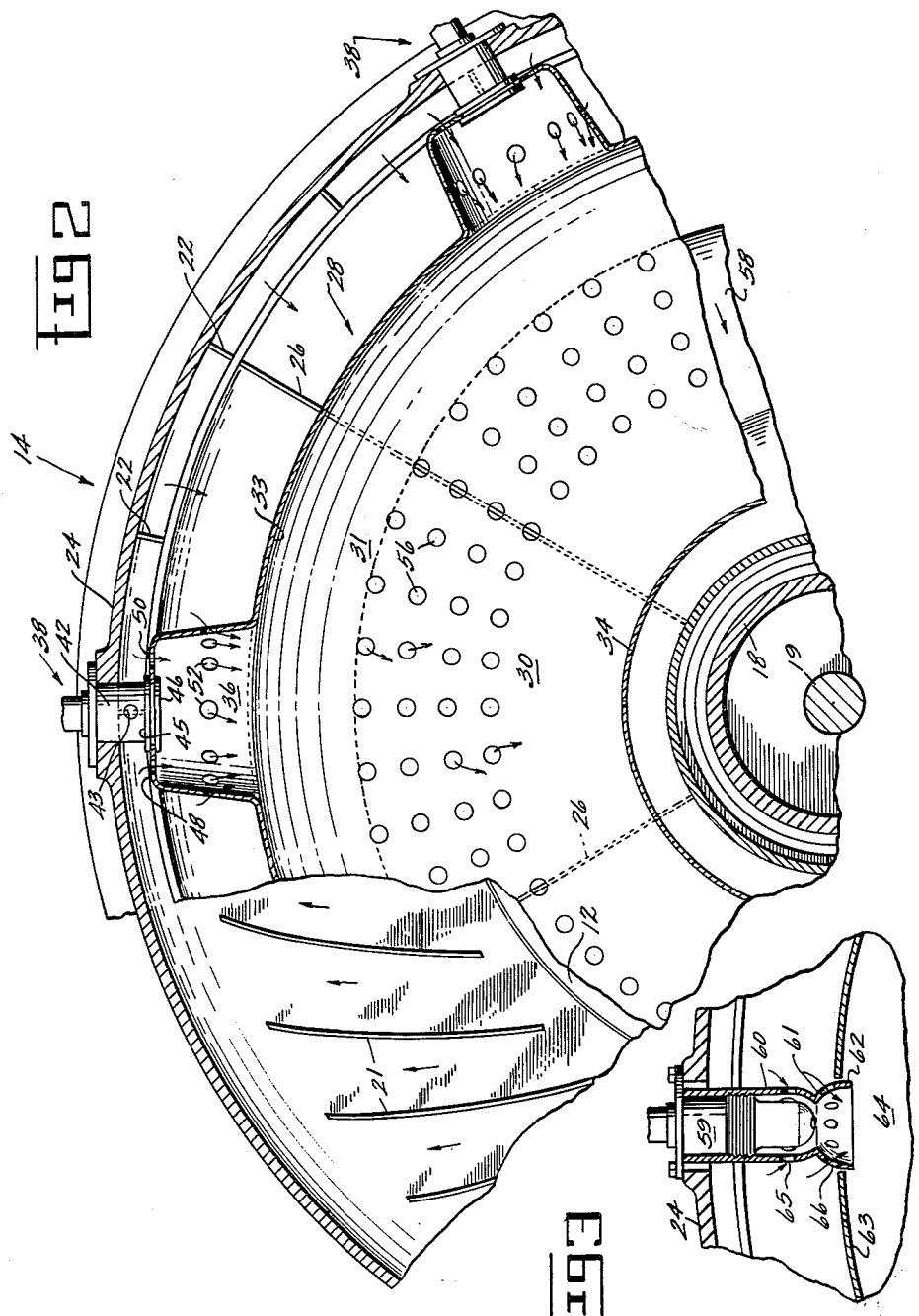

United States Patent Office 3,088,279
Patented May 7, 1963

3,088,279
RADIAL FLOW GAS TURBINE POWER PLANT
Gunther Ernst Diedrich, Cincinnati, Ohio, assignor to General Electric Company, a corporation of New York
Filed Aug. 26, 1960, Ser. No. 51,943
2 Claims. (Cl. 60—39.36)

This invention relates to a radial flow gas turbine power plant and, more particularly, to an improved compact radial inflow combustion apparatus for such a power plant.

Engine manufacturers are continually searching for methods and means whereby relatively compact gas turbine power plants having high power-to-weight ratios can be built more efficiently and more economically. An example of this type of power plant is one wherein the gas flow is radial relative to the engine axis, i.e., either radially inward or radially outward. This type is to be distinguished from another basic kind of power plant wherein the gas flow is axial, such as is usually the case with the larger turbojet aircraft engines. Although a radial-flow gas turbine power plant has obvious advantages because of its reduced axial length, e.g., it needs fewer main bearings, such an engine presents certain problems, particularly in the design of the combustor section.

For instance, a typical combustor, either radial or axial flow, usually includes an outer casing or shell and an inner liner or flame tube. For the most efficient utilization of the air flow received from the compressor it is necessary to achieve what is known as a "stoichiometric" burning condition in the area adjacent the fuel nozzle. About 5% of this air flow is typically used to break the fuel into fine droplets, i.e., to atomize it, in order to permit more complete intermixing to take place. Means to allow this atomizing air to enter the liner primary zone near the injector may consist simply of a plurality of apertures or louvers surrounding the fuel injector nozzles. These apertures or louvers may or may not include swirl inducing means designed to aid in the mixing process. A further 15% (approximately) of the air from the compressor is then added to the primary combustion zone through additional apertures or louvers to achieve the desired stoichiometric condition. The fuel-air ratio in the typical gas turbine power plant will, of course, vary for the type of fuel involved. For example, with certain types of jet engine fuel, a fuel-air ratio of 1 to 14.6 (by volume) is necessary to achieve a stoichiometric condition, or highest efficiency at the desired temperature.

When the desired burning condition is achieved in the primary combustion area, the temperature of the gas stream may be 2,000 or as high as 4,000° F. The most commonly used turbine blades, however, are not made to withstand such high temperatures. Therefore, the temperature must be brought down, say, to within the 1100 to 1600° F. range. This is usually accomplished in the typical elongated axial-flow combustor by introducing secondary or cooling air into the combustion chamber liner downstream of the primary area, in what is called a "secondary" or "mixing" zone. The problem of achieving the correct turbine inlet temperature, or combustible gas stream profile, as it is sometimes called, is complicated by the fact that in most of the known combustor designs there are no defined primary and secondary zones. In addition, in the typical axial-flow gas turbine engine, a significant portion of the secondary air flow may not completely penetrate the hot core of combustible gases emerging from the primary zone. Consequently, in an annular type of combustor, such as is shown in the patent to Berggren et al.—2,560,257—it is possible that each turbine blade could have a hot zone in its middle portion seen radially, with the root and tip portions being much cooler. The result is contraction and expansion of the blade during engine cycling from an operative to a non-operative mode, which can fatigue the blades to the extent that cracks develop.

In axial-flow jet engines, one approach aimed at overcoming this problem is to utilize the so-called "cannular" type of combustion chamber. In this type of chamber an annular casing surrounds a plurality of smaller cans containing liners. The actual burning takes place within these inner liners. As the turbine rotor spins, therefore, the blades see a succession of hot and cold areas. Due to the speed at which the rotor is turning, the turbine blades integrate the temperature fluctuation and the result is an average temperature. However, this approach requires a combustion chamber having relatively long inner cans and liners. This extra length is necessary to obtain a sufficiently low pressure ratio from outside to inside of the liner, which ratio, or pressure drop, is used to cause the secondary air flow to penetrate the hot inner core, since a relatively large (e.g., on the order of 7%) pressure drop is undesirable as it may result in an unwanted loss in pressure head, with a consequent loss of turbine efficiency. Thus, the trend in this type of combustor design has been to increase the number and/or size of the air holes and consequently, the length of the liner in order to obtain both the necessary air penetration and the lower (preferably about 3%) pressure drop. Another method aimed at obtaining the desired gas stream temperature profile in the case of an axial-flow jet engine is the use of a flow-splitter to change the direction of flow in the turbine inlet. However, flow-splitters have proven very difficult to design in that distortion is common as a result of the splitters being quite sensitive to changes in r.p.m. and in Mach number, which can cause undesirable fluctuations in pressure drop.

Designers of the more compact radial-flow type of gas turbine engine, on the other hand, have found the above-mentioned procedures unsuitable as a means for providing the correct temperature profile at the turbine inlet. For example, in a radial-flow jet engine the use of a number of radially or tangentially extending burner cans which have been elongated to any great extent usually results in excessive engine diameters. This design approach is typified in the prior art devices which make use of a tangential or vortex arrangement of a plurality of cans or inner liners. Another type of known radial-flow gas turbine engine design involves a radially outward flowing combustible gas stream, including provision for somewhat costly and complicated, and usually troublesome, centrifugal fuel supplying devices buried in the center of the engine. In addition, the known radial outflow engine designs usually do not provide discrete primary and secondary combustion zones. Besides suffering from poor fuel nozzle accessibility, the above-mentioned engine designs have also been forced to adopt a tortuous flow path for the combustible gas stream. Even in those prior art devices which appear to show discrete primary and secondary zones, these are only realized as a result of an often complicated, hard to manufacture and expensive combustion chamber design, utilizing a plurality of cans or combustion chamber liners with the relative disadvantages mentioned above.

Attempts have been made to solve the above-mentioned problems in the design of radial-flow combustion chambers by providing a single "doughnut shaped" liner. Such devices, however, usually suffer from the fact that the gas streams in the "primary" and in the "secondary" zones, if indeed, there be discrete zones identifiable as such, flow in different directions. This means poor control of hot spots in the combustible gas stream which results in a relatively poor temperature profile at the turbine inlet. In short, it would be desirable to be able to control the exact location of the primary combustion initiating and sustaining zone relative to the secondary zone and to obtain the desired temperature profile without the use of complicated swirl vanes or flow-splitting devices in a compact radial-flow type of gas turbine engine.

Accordingly, an object of my invention is to provide an improved compact combustion apparatus for use with a radial-flow, or a combination of axial and radial-flow, gas turbine power plant.

A further object of my invention is to provide an improved, compact radial inflow type combustion chamber having discrete primary and secondary combustion zones.

Another object of my invention is to provide a combustion chamber for a radial-flow gas turbine power plant which chamber is of the radial inflow type having a plurality of discrete primary combustion initiating and sustaining zones and a discrete secondary combustion zone and which presents a desirable combustible gas stream temperature profile at the turbine inlet.

Still another object of my invention is to provide a compact, relatively inexpensive, simple, and easily constructed and maintained liner for use in the combustion chamber of a radial inflow type of gas turbine power plant.

Briefly, in accordance with one aspect of my invention, I provide an improved combustion apparatus for use with a radial-flow gas turbine engine, the apparatus including an annular outer casing and a toroid-like liner positioned within the casing, the liner being slightly elongated in a radially inward direction to provide a single discrete secondary combustion zone and having a plurality of combustion initiating and sustaining means positioned about the outer periphery thereof. The combustion initiating and sustaining means provides a plurality of discrete primary combustion zones in radially inward flow communication with the discrete secondary zone. A plurality of symmetrically arranged apertures located in the walls of the combustion initiating and sustaining means permit a predetermined amount of combustible gas (air) to flow into the primary zones in a manner such that a stoichiometric burning condition is achieved. Further apertures in the elongated portion of the liner and flow guiding means within the casing cooperate to direct secondary air inwardly of the liner to sustain the combustion and cool the hot inner core of the gas stream to obtain a desired temperature profile at the turbine inlet. The entire combustion apparatus is characterized by the fact that the combustion sustaining gas flow is substantially radially inward of the engine throughout the entire length of the primary and secondary zones of the liner.

Other objects and advantages of my invention will become more apparent and perhaps better understood from the following description taken in connection with the accompanying drawings in which:

FIGURE 1 is a vertical elevation, in cross section, illustrating one embodiment of a gas turbine power plant utilizing my improved radial inflow combustion chamber apparatus; and FIGURE 2 is a partial elevation taken along line 2—2 of FIG. 1 and partially cut away to show the arrangement of the power plant diffuser vanes; and FIGURE 3 is a fragmentary elevation partially in cross section, showing a further embodiment of the liner primary and secondary combustion zone arrangement; and FIGURE 4 is a fragmentary view, partially in cross section, illustrating still another embodiment of the liner primary and secondary combustion zone arrangement.

Almost all gas turbine engine combustors can be put into two main groups depending on the flow direction of the combustion gases relative to the engine axis, i.e., either axial or radial. The present combustion apparatus, which relates to the second group as explained above, is especially adaptable to fit into the space between a radial compressor, or impeller, and an axial turbine. As will be understood from the following detailed description, my invention provides a gas flow path having a minimum of turning due to the fact that the air flowing radially outward from the impeller—through a diffuser—moves substantially radially inward throughout the entire length of the combustion chamber. That is to say, there is no reverse flow of air once the air has left the compressor. This differs, as has been said, from the reverse flow or vortex type of combustor cited above, or the radial outward flow type of combustors.

By referring now specifically to the drawings, it will be seen that FIG. 1 illustrates one embodiment of my invention as used in a compact type of gas turbine power plant. The power plant shown comprises a centrifugal air compressor or impeller 10, a diffuser 12, my improved radial inflow combustion apparatus, indicated generally at 14, and a gas generator turbine 16. The impeller is driven by the turbine 16 through suitable connecting means, such as a drum shaft 18. A tie rod or bolt 19 may also be provided for rigidly coupling the compressor and the turbine to the drum shaft. The compressed air from the impeller 10, which may or may not be pre-compressed by an axial compressor, a portion of which is indicated at 20, is directed into the diffuser and a plurality of diffuser vanes 21 are provided to further direct the air between diffuser outlet guide vanes 22 which, as is best seen from FIG. 2, are straight. The diffuser vanes 21 are only slightly curved and do not, therefore, impart any large amount of swirl to the air.

In the embodiment shown in FIG. 1, the generally "doughnut-shaped" combustion chamber which is the heart of my invention, includes an outer annular casing 24 having on the front and back inner walls thereof a plurality of structural members or vanes 26. Supported within the casing and intermediate the structural members, which can serve as flow guiding means if it is so desired, is a combustion liner, indicated generally at 28. As shown in this embodiment, the combustion liner includes a one piece main body portion 30 having a front wall 31, a rear wall 32, and an outer wall 33. It will be noted that the main body portion is slightly elongated in a radially inward direction and curves axially at 34 so as to be attachable to the turbine inlet diaphragm 35. This gives the liner its characteristic toroid-like or doughnut shape.

In keeping with the objects of my invention, spaced about the outer periphery of the generally toroidal liner are a plurality of discrete primary combustion initiating and sustaining zones. In the embodiment of FIG. 1, the means comprising these zones take the form of a plurality of domes or inverted cups, one of which is indicated generally at 36, attached to or positioned about the liner outer wall 33. Suitable means are provided to supply fuel to each primary combustion zone. This can comprise the nozzle or fuel spraying device indicated generally at 38, which may be like the "Fuel Injector Nozzle" shown in the patent to Benson et al.—2,926,495—assigned to the present assignee. The injector nozzle which may have a conical or a flat spray, includes an injector body 39 having a centrally located orifice 40 in its inner end. An outer shield or shroud 42 having an axially opening aperture 43 for cleaning air flow is positioned about the injector body. The inner end of the shroud has an enlarged flange 44 which is slotted at 45, or otherwise adapted, to enable the shroud to be securely retained in an opening 46 in the outermost wall 48 of the inverted cup. The flange has a central aperture 49 to permit fuel from the orifice 40 to spray into the primary combustion zone defined by the cup. Spaced outwardly of the injector flange 44 in the dome wall are a plurality of openings or louvers 50 designed to permit atomizing air flow to enter the primary zone. Slightly below, i.e., downstream in the primary zone, are a second series of openings 52 which are sized and arranged to permit further air flow to enter the primary zone. The openings 50 and 52 are arranged so that a radially symmetric inward flow of air occurs in the correct proportion necessary to achieve stoichiometric burning in the primary zone depending on the type of fuel involved. Obviously, for different fuels different numbers and/or sizes of holes or louvers will be utilized. Ignition means are also provided to initiate the combustion process, and since my liner has a single discrete secondary combustion zone in flow communication with each of the discrete primary zones, it has been found that a single igniter plug 54 will suffice, although more than one may be utilized to facilitate cross-firing of the primary zones. A number of additional openings or louvers 56 are provided in the main body portion 30 of the liner. These latter openings are also symmetrically arranged and are located in the front and rear liner walls 31 and 32, respectively. The openings 56 provide secondary mixing or cooling air to enter the combustor liner. It will be realized that the radially-extending structural members 26 will assist in guiding the air flow into the liner, thus helping to achieve the correct uniform temperature profile at turbine inlet. Conical baffle plates 58 may also be provided on the inside front and rear casing walls to cooperate with the member 26 in directing air into the combustion liner with increased velocity.

FIGURE 2 perhaps more clearly shows how discrete primary combustion zones are provided by means of the separate inverted domes or cups 36 spaced about the periphery of the main body portion 30 of the liner. Also clearly shown in this drawing is the symmetrical arrangement and location of the openings or louvers 56 which may be placed between as well as below the domes. The arrows indicate the secondary mixing and cooling air being directed by the cooperating structural member 26 and the baffles 58 into the liner.

FIGURE 3 shows a further embodiment of my improved combustion apparatus having a somewhat different primary and secondary combustion zone arrangement. In this embodiment, the primary combustion means are made integral with fuel supplying means 59. Thus, a nozzle shroud 60 is elongated at 61 to form a dome or inverted cup. Moreover, each cup or dome is adapted to fit loosely in an aperture 62 in the outer wall 63 of the main body portion of a liner 64 by reason of the aperture being made slightly larger than the shroud. This provides a simple, easily manufactured liner and nozzle arrangement which can be easily and inexpensively maintained. A further advantage of this arrangement is that free thermal expansion of the liner and domes in relative radial directions is provided. The fuel supplying means, including the shroud 60 may be separately removed, cleaned, or repaired if necessary without disturbing or removing the combustion chamber liner, in this embodiment. The shroud 60 and dome portion 61 also include openings 65 and 66, respectively to provide circumferential injection of air over the nozzle body, for cleaning and for insuring stoichiometric burning in the primary zone formed by the elongated shroud.

FIGURE 4 indicates still a further embodiment of my improved combustion apparatus wherein the toroid-shaped main body portion of the liner contains a series of protrusions, formed in the outer periphery of the liner which serve as the primary combustion zone. This design can provide a still more economically manufactured combustor liner arrangement. The liner 67 can comprise a single piece, or two halves welded together to form an integral body, in which the primary combustion zones consist of a series of curved flanged openings, one of which is shown at 68, pushed out by dies or by any other suitable forming method. In this embodiment, the nozzle 69 is shown as having an angled portion 70 whereby fuel is injected into the main body or secondary portion of the liner with a slight tangential inclination. This arrangement is especially desirable where the diffuser vanes are provided with an increased swirl-inducing curvature. A disk 72 attached to the nozzle is adapted to fit part way into the flanged opening to cooperate with the outwardly curved, generally cylindrical flange to form the "dome" of the primary combustion zone. Openings 74 and 76 in the disk and flange, respectively, provide the necessary air flow.

Thus, it will be seen that my improved "doughnut-shaped" combustion apparatus makes possible a compact gas turbine design which avoids the complicated ducting arrangements and torturous gas flow passages of the known prior art devices. The liner, which is characterized by the substantially radially inward flow of the gases over the entire length of the liner, also clearly distinguishes the primary combustion zones from the secondary mixing zone by means of the cups or domes located radially about the toroid-shaped main body portion. This permits easy maintenance or replacement of the fuel nozzle assemblies since the nozzles will be accessible from outside the engine, and, in at least one embodiment of the invention, are not integral with the main liner body. The discrete primary combustion zones can be cylindrical or cone shaped, as long as the air openings are symmetrically arranged and located as described above. Finally, it should be obvious that my improved radial inflow combustion apparatus can be easily and inexpensively manufactured, maintained and/or replaced, since there is no need for individual cans or liners which must be affixed to involved ducting by complicated bolting to other troublesome fastening arrangements.

I claim.

1. Combustion aparatus for use in a radial-flow gas turbine power plant having a centrifugal air compressor, a radially-extending diffuser connected to the outlet of said compressor, and a turbine for driving said compressor, said apparatus comprising: an annular combustor casing having a plurality of axially-spaced, radially-extending members on front and back inner walls thereof; a toroidal-shaped liner supported within the casing, said liner having an inner elongated portion defining a discrete secondary combustion area, a plurality of circumferentially-spaced cup-shaped members positioned on the periphery of said liner, said cup-shaped members having fuel supplying means in the outermost walls thereof and forming discrete primary combustion areas therewith, said primary areas being relatively small in comparison with said secondary area; a plurality of enlarged openings in said liner periphery opposite said cup-shaped members to supply flow communication between said cup-shaped members and said secondary combustion area, said openings surrounding at least a portion of the cup-shaped members, said cup-shaped members and said liner each having a plurality of symmetrically arranged apertures in walls thereof through which gas flow from said diffuser is directed to provide a desired temperature profile of the combustible gas flow in the liner, said liner and said guide members coperating to direct the gas flow radially inward throughout the entire length of the primary and secondary combustion areas.

2. Combustion apparatus for use in a radial-flow gas turbine power plant having a centrifugal air compressor, a radially-extending diffuser connected to the outlet of said compressor, and a turbine for driving said compressor, said apparatus comprising: an annular combustor casing having a plurality of radially-extending guide vanes on front and back inner walls thereof; a toroidal-shaped liner supported in said casing intermediate the guide vanes, said liner including a front, a back, and an outer wall, and an inner axially-opening neck portion, the liner walls forming an integral main body portion which defines a discrete secondary combustion area; a plurality of inverted cup-shaped members disposed about said outer liner wall and adjacent the diffuser outlet, said cup-shaped members defining discrete primary combustion areas and being in direct flow communication with said secondary combustion area; each of said discrete primary areas being small relative to said discrete secondary area; nozzle means supported by said casing and extending radially inward thereof to supply fuel to the interior of said cup-shaped members, said cup-shaped members and nozzle means being separably removable as a unit from said liner, said members and said main body portion each having a plurality of symmetrically-arranged openings through which airflow from said diffuser is directed inwardly by said guide vanes and said liner front and back walls, in cooperation, to provide a predetermined temperature profile of the gas flow leaving said neck portion, said gas flow being directed radially inward throughout the entire length of said primary and secondary combustion areas.

References Cited in the file of this patent

UNITED STATES PATENTS

| | | |
|---|---|---|
| 2,601,000 | Nerad | June 17, 1952 |
| 2,620,626 | Lysholm | Dec. 9, 1952 |
| 2,650,060 | Stalker | Aug. 25, 1953 |
| 2,895,295 | Carlson | July 21, 1959 |

FOREIGN PATENTS

| | | |
|---|---|---|
| 588,572 | Great Britain | May 28, 1947 |